(12) United States Patent
Alecu et al.

(10) Patent No.: US 8,182,201 B2
(45) Date of Patent: May 22, 2012

(54) LOAD DISTRIBUTION SYSTEM FOR GAS TURBINE ENGINE

(75) Inventors: Daniel T. Alecu, Toronto (CA); John Watson, St. Lambert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 524 days.

(21) Appl. No.: 12/429,234

(22) Filed: Apr. 24, 2009

(65) Prior Publication Data

US 2010/0272556 A1    Oct. 28, 2010

(51) Int. Cl.
*F01D 3/00*    (2006.01)
*F01D 3/04*    (2006.01)

(52) U.S. Cl. ....... 415/104; 415/107; 415/115; 60/39.07; 60/726; 60/784

(58) Field of Classification Search .................. 415/104, 415/107, 115, 117, 118, 229; 60/39.07, 726, 60/784
See application file for complete search history.

(56) References Cited

U.S. PATENT DOCUMENTS

| | | |
|---|---|---|
| 2,647,684 A | 8/1953 | Lombard |
| 3,433,020 A | 3/1969 | Earle, Jr. et al. |
| 4,306,834 A | 12/1981 | Lee |
| 4,309,144 A | 1/1982 | Eggmann et al. |
| 4,697,981 A | 10/1987 | Brown et al. |
| 4,864,810 A | 9/1989 | Hines |
| 4,969,797 A | 11/1990 | Takara et al. |
| 4,993,917 A | 2/1991 | Kulle et al. |
| 5,141,389 A | 8/1992 | Bear et al. |
| 5,312,225 A | 5/1994 | Lorenzen |
| 5,791,868 A | 8/1998 | Bosley et al. |
| 5,862,666 A | 1/1999 | Liu |
| 6,067,791 A | 5/2000 | Patel |
| 6,457,933 B1 | 10/2002 | Przytulski et al. |
| 7,156,613 B2 * | 1/2007 | Friedl ........................ 415/104 |
| 2007/0122265 A1 * | 5/2007 | Ansari et al. ................ 415/104 |

* cited by examiner

*Primary Examiner* — David Nhu
(74) *Attorney, Agent, or Firm* — Norton Rose Canada LLP

(57) ABSTRACT

There is provided an axial bearing load distribution system for a gas turbine engine of the type having a low pressure rotor supported by axial bearings. The system comprises a line having an inlet end positioned in a high-pressure compressor gas path downstream of any compressor stage provided with a variable geometry. The line is adapted to sense static pressure in the high-pressure compressor gas path. The line has an outlet end producing the static pressure. An air-tight pressure actuator is operatively connected to the outlet end and to one of the axial bearings to exert a force on the axial bearing proportionally to a pressure of the outlet end.

18 Claims, 2 Drawing Sheets

LOAD DISTRIBUTION SYSTEM FOR GAS TURBINE ENGINE

TECHNICAL FIELD

The application relates generally to gas turbine engines and, more particularly, to a load distribution system for bearings supporting a gas turbine engine main shaft.

BACKGROUND OF THE ART

In gas turbine engines, the turbine engine low pressure rotor is subjected to aerodynamic axial forces, typically oriented backward due to the high reaction degree of the low pressure turbine and the low reaction degree of the fan. The aerodynamic axial forces are the result of the air pressure distribution over the rotor surface area. Typically one axial bearing is installed to react to the rotor axial forces. In case that more than one axial bearing for the low pressure rotor is used, the axial bearings supporting the rotor may not be proportionally loaded. This may result in a premature wear of the axial bearings supporting the rotor.

Accordingly, there is a need to provide an improved load distribution system for distributing the axial load on the bearings of the low pressure rotor of gas turbine engines.

SUMMARY

In one aspect, there is provided an axial bearing load distribution system for a gas turbine engine of the type having a low pressure rotor supported by axial bearings comprising: a line having an inlet end positioned in a high-pressure compressor gas path downstream of any compressor stage provided with a variable geometry, and adapted to sense static pressure in the high-pressure compressor gas path, and an outlet end producing the static pressure; and an air-tight pressure actuator operatively connected to the outlet end and connected to one of the axial bearings to exert a force on the axial bearing proportionally to a pressure of the outlet end; whereby an axial load varying with an engine regime is distributed between the axial bearings supporting the rotor.

In a second aspect, there is provided a gas turbine engine of the type having a high pressure rotor and a low pressure rotor, the low pressure rotor comprising: at least a fixed axial bearing and a floating axial bearing, the fixed axial bearing being fixed to a casing of the gas turbine engine, the floating axial bearing being operatively connected to the gas turbine engine so as to be axially displaceable relative to the casing; a load distribution system comprising a line having an inlet end positioned in a high-pressure compressor gas path downstream of any compressor stage provided with a variable geometry, and adapted to sense static pressure from the gas path, and an outlet end producing the static pressure; and a pressure actuator positioned at the outlet end and connected to the floating axial bearing to exert a force on the floating axial bearing proportionally to a pressure of the static pressure to adjust the axial position of the floating axial bearing along the rotor; whereby an axial load on the low pressure rotor is distributed between the axial bearings supporting the rotor.

In a third aspect, there is provided method for balancing loads on axial bearings supporting a low pressure rotor in a gas turbine engine comprising: providing a line having an inlet end exposed to a high-pressure compressor gas path downstream of any compressor stage provided with a variable geometry, and an outlet end adjacent to a floating axial bearing, and a pressure actuator in the outlet end connected to the floating axial bearing; subjecting the inlet end of the line to the gas path, whereby the inlet end and the outlet end are subjected to the same static pressure; and exerting a force on the floating axial bearing with the pressure actuator as a result of the pressure differential between an inside exposed to the static pressure, and an outside of the actuator.

DESCRIPTION OF THE DRAWINGS

Reference is now made to the accompanying figures, in which.

DETAILED DESCRIPTION

Figure 1:
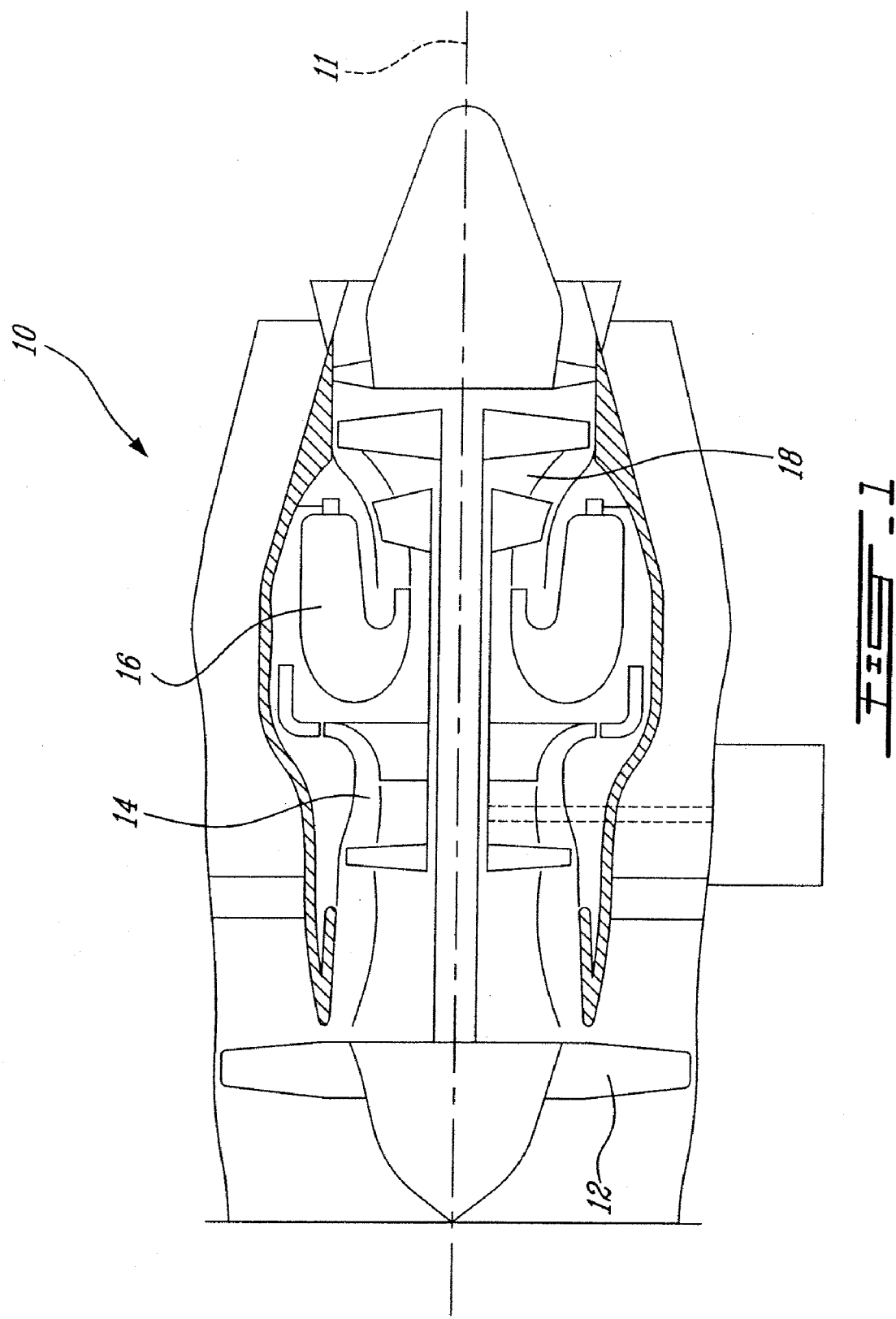
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
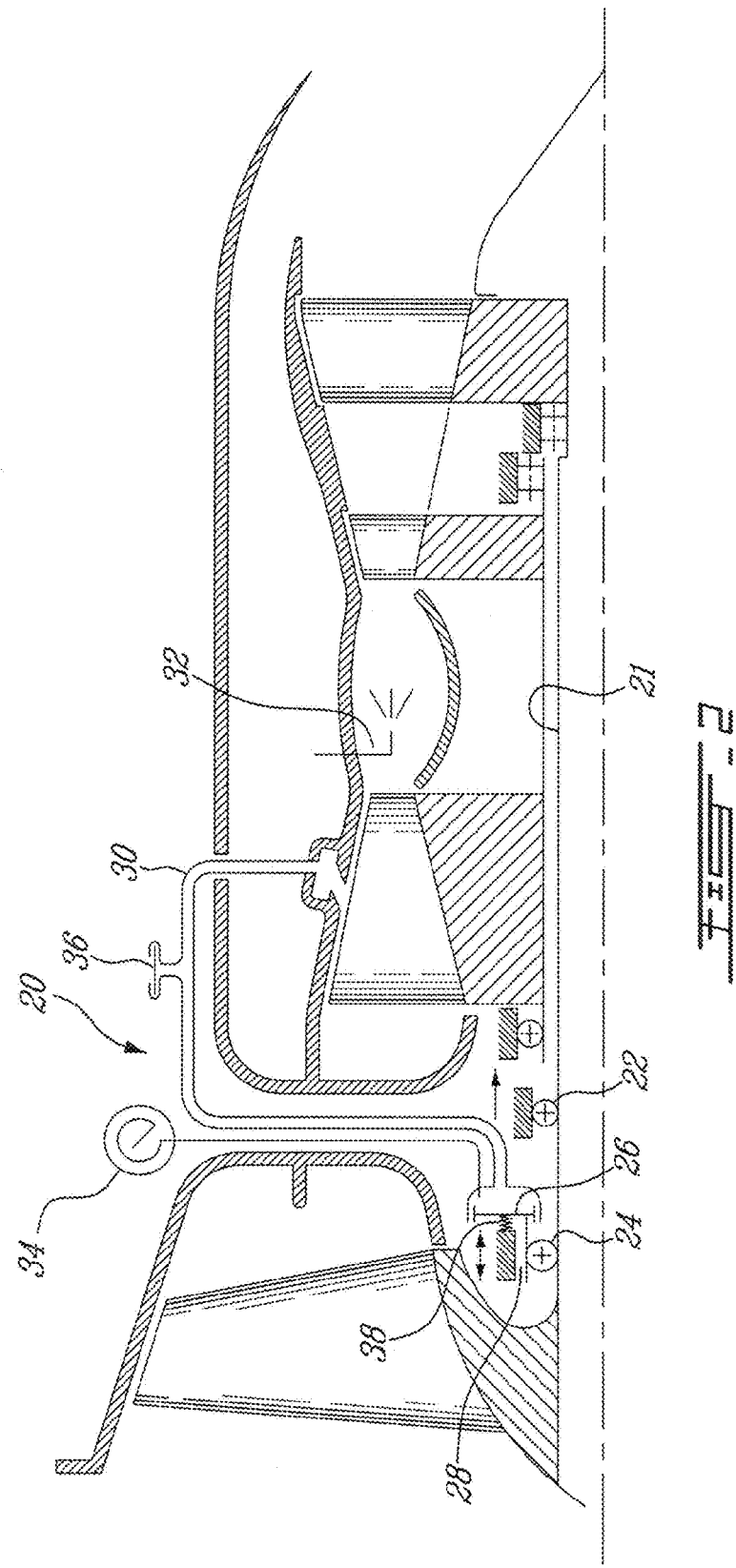
FIG. 2 is an enlarged view of the gas turbine engine of FIG. 1, illustrating an axial load distribution system for bearings of a rotor thereof.

Referring to FIG. 2, the gas turbine engine 10 is equipped with a load distribution system 20. The load distribution system 20 is provided to distribute the axial load sustained by bearings supporting the low pressure spool or rotor 21 in the engine 10. The low pressure rotor 21 is radially and axially supported at the front by fixed axial bearing 22 and by floating axial bearing 24, although the rotor 21 may have more than two axial bearings. The outer race of the fixed axial bearing 22 is in a fixed axial position relative to the static engine casing.

The floating axial bearing 24 is axially displaceable (i.e., axially floating) with respect to the static engine casing. More specifically, the floating axial bearing 24 is connected to a pneumatic actuator 26. The outer race of the floating axial bearing 24 is connected to the engine 10 by an appropriate arrangement enabling the axial movement thereof. For instance, a squeezed oil-film damper arrangement 28 may be used to allow the axial movement of the floating axial bearing 24 with respect to the engine casing.

The pneumatic actuator 26 is installed on the engine fixed casing or is an integral part thereof. The pneumatic actuator 26 may comprise a sealed ring circumferentially positioned about the rotor 21. The sealed ring of the pneumatic actuator 26 acts as a piston exposed to pressurized air at an outlet end of a pressure line 30. As an alternative to the sealing ring arrangement, the pneumatic actuator 26 may use a tandem piston arrangement, or metallic bellows, amongst other possibilities. The pneumatic actuator 26 is air-tight such that the pressure line 30 has no net positive flow, i.e. the pressure line 30 is a pressure sensing line. The pneumatic actuator 26 may have a device to preload the piston, such as a spring 38, a diaphragm, or the like. The device performs a constant preload on the piston (e.g., 20% of the maximum force) so as to preclude force reversal on the bearing 22.

The pressure line 30 has an inlet end positioned in the main gas path 32 of the gas turbine engine 10, so as to sense the local static pressure. The inlet is positioned at a location downstream of the compressor stages of variable geometry, such as the variable inlet guide vanes, the handling bleed valves, and the low-pressure cabin bleed port, which location provides a static pressure consistently proportional to the high-pressure compressor pressure ratio. The inlet may be installed downstream of the high pressure turbine and upstream of the low pressure turbine because there is no flow in the pressure line 30, hence the actuator end of the pressure line 30 remains at a same temperature. The inlet end of the pressure line 30 may be upstream of the low pressure turbine as there is low pressure available downstream of the low pressure turbine. One such location is the inlet of the combustor chamber. The variation of pressure with the engine regime (i.e., engine power and flight conditions) at the location is sufficient to actuate the pneumatic actuator 26 in providing the thrust force to the floating bearing 24 required to balance a portion of the low pressure rotor axial force such that the fixed bearing 22 supports the rest of the axial force. Accordingly, by collecting gas in the gas path of the engine 10, the pressure of the gas is proportional to the pressure distribution in the gas path, and hence is proportional to the axial forces exerted on the rotor 21.

The pressurized gas actuates the pneumatic actuator 26 with the gas collected by the inlet end in the gas path 32. As it is subjected to the pressurized air from the gas path 32, the pneumatic actuator 26 will be displaced on a relatively small distance sufficient to compensate for the total backlash on the bearing 24 and 22 as well as for differential thermal expansion between engine casings and the low pressure rotor 21. When there is a pressure differential across the pneumatic actuator 26, the pneumatic actuator 26 will exert a force on the floating axial bearing 24 that is proportional to this pressure differential. The pressure differential is proportional to the aerodynamic forces acting upon the rotor 21, which forces are dependent on engine power and ambient conditions (e.g., altitude). Accordingly, the axial load is distributed in a generally constant ratio for any engine regime.

Gas that may be leaked by the actuator 26 in case of excessive wear collects in the bearing cavity and mixes with pressurization air sealed in the cavity. The mixture may be released through the cavity scavenge system (not shown). As a result, the fixed axial bearing 22 and the floating axial bearing 24 may remain proportionally loaded.

The load distribution system 20 provides a proportional axial load distribution between bearings 22 and 24 at any engine power or for any ambient conditions, without requiring any external pressure regulating system or any continuous air flow. As a result, there is a negligible pressure loss in the gas path, and therefore a negligible effect on the fuel consumption of the engine 10. If a tandem piston arrangement is used as an alternative to the sealed ring piston, pressurized gas from a lower pressure location (i.e., cooler gas) may be used to operate the pneumatic actuator 26.

Still referring to FIG. 2, a pressure indicator 34 and a temperature indicator 36 are provided in the pressure line 30, so as to measure parameters associated with the actuation of the pneumatic actuator 26. The pressure indicator 34 provides a visual indication that the pneumatic actuator 26 receives the correct pressure. More specifically, if the pneumatic actuator 26 is air tight, then there should be no air flow through the pressure line 30 under steady state conditions. If a pressure loss is detected by the pressure indicator 34, there is a major leakage at the pneumatic actuator 26, or at any point between the inlet and the pressure actuator 26 in the pressure line 30. Moreover, the absence of an air flow through the pressure line 30 results in the pressure line 30 temperature being colder than that in the gas path 32. The temperature indicator 36 can therefore be used to detect leakage of the pneumatic actuator 26, by indicating a temperature increase resulting from hot gas flowing through the pressure line 30. A temperature variation as measured by the temperature indicator 36 is an indication of a minor leakage at the pressure actuator 26, requiring maintenance.

The pressure indicator 34 may be connected to the pressure line 30 adjacent to the pneumatic actuator 26, whereas the temperature indicator 36 may be at an intermediary position, or any other suitable position, along the pressure line 30. The displays of the indicators 34 and 36 are at a visible location, for instance to allow a simple visual check. Any appropriate technology may be used as part of the pressure indicator 34 and the temperature indicator 36 to measure pressure and temperature, respectively. For instance, the pressure indicator 34 may be a tension-sensitive fastener or a pressure switch, amongst other alternatives, while the thermal indicator 36 may be an off-the-shelf gas furnace pilot flame thermal switch.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. An axial bearing load distribution system for a gas turbine engine of the type having a low pressure rotor supported by axial bearings comprising:
    a pressure line having an inlet end positioned in a high-pressure compressor gas path downstream of any compressor stage provided with a variable geometry to be exposed to a static pressure in the high-pressure compressor gas path, and an outlet end transmitting the static pressure; and
    an air-tight pressure actuator operatively connected to the outlet end and connected to one of the axial bearings to exert a force on the axial bearing proportionally to a pressure of the outlet end.

2. The axial bearing load distribution system according to claim 1, wherein the pressure actuator has a ring-shaped piston adapted to be connected to the axial bearing, the ring-shaped piston being subjected to a pressure in the outlet end to move at any positive pressure in the pressure line and to provide an axial force as a function of a pressure in the pressure line.

3. The axial bearing load distribution system according to claim 1, further comprising a preloading device to reduce by a constant magnitude the force provided by the pressure actuator at the outlet end to allow movement of the actuator when a given pressure is reached.

4. The axial bearing load distribution system according to claim 1, further comprising a pressure indicator connected to the pressure line to display a pressure loss so as to indicate leakage across the pressure actuator or in the pressure line at any point between the inlet and the pressure actuator.

5. The axial bearing load distribution system according to claim 1, further comprising a temperature indicator connected to the pressure line to display a temperature increase in the pressure line so as to indicate a leakage across the pressure actuator.

6. The axial bearing load distribution system according to claim 1, wherein the inlet end is at the inlet of the combustion chamber.

7. The axial bearing load distribution system according to claim 1, wherein the inlet end of the pressure line is positioned upstream of the low-pressure turbine.

8. A gas turbine engine of the type having a high pressure rotor and a low pressure rotor, the low pressure rotor comprising:
- at least a fixed axial bearing and a floating axial bearing, the fixed axial bearing being fixed to a casing of the gas turbine engine, the floating axial bearing being operatively connected to the gas turbine engine so as to be axially displaceable relative to the casing;
- a load distribution system comprising a pressure line having an inlet end positioned in a high-pressure compressor gas path downstream of any compressor stage provided with a variable geometry to be exposed to a static pressure in the light-pressure compressor path, and an outlet end transmitting the static pressure; and a pressure actuator positioned at the outlet end and connected to the floating axial bearing to exert a force on the floating axial bearing proportionally to a pressure of the static pressure to adjust the axial position of the floating axial bearing along the low pressure rotor.

9. The gas turbine engine according to claim 8, wherein the pressure actuator has a ring-shaped piston adapted to be connected to the axial bearing, the ring-shaped piston being connected to the outlet end to move as a function of a pressure in the pressure line.

10. The gas turbine engine according to claim 8, further comprising a preloading device to preload the pressure actuator at the outlet end to allow movement of the actuator when a given pressure is reached.

11. The gas turbine engine according to claim 8, further comprising a pressure indicator connected to the line to display a pressure loss so as to indicate leakage across the pressure actuator.

12. The gas turbine engine according to claim 8, further comprising a temperature indicator connected to the pressure line to display a temperature increase in the pressure line so as to indicate leakage across the pressure actuator.

13. The gas turbine engine according to claim 8, wherein the floating axial bearing is operatively connected to the gas turbine engine by an oil-film damper.

14. The gas turbine engine according to claim 8, wherein the inlet end of the pressure line is positioned upstream of the low-pressure turbine of the gas turbine engine.

15. A method for balancing loads on axial bearings supporting a low pressure rotor in a gas turbine engine comprising:
- providing a pressure line having an inlet end exposed to a high-pressure compressor gas path downstream of any compressor stage provided with a variable geometry, and an outlet end adjacent to a floating axial bearing, and a pressure actuator in the outlet end connected to the floating axial bearing;
- subjecting the inlet end of the pressure line to the high-pressure compressor gas path, whereby the inlet end and the outlet end are subjected to the same static pressure; and
- exerting a force on the floating axial bearing with the pressure actuator as a result of the pressure differential between an inside exposed to the static pressure, and an outside of the pressure actuator.

16. The method according to claim 15, further comprising preloading the pressure actuator prior to subjecting the pressure actuator to the pressure differential such that a total force of the pressure actuator must exceed a preloading force for the pressure actuator to move.

17. The method according to claim 15, further comprising indicating a presence of a leak across the pressure actuator or in the pressure line at any point between the inlet and the pressure actuator by displaying a pressure loss measured in the pressure line.

18. The method according to claim 15, further comprising indicating a presence of a leak across the pressure actuator by displaying a temperature increase measured in the pressure line.

* * * * *